(12) United States Patent
Kakehi et al.

(10) Patent No.: US 9,527,492 B2
(45) Date of Patent: Dec. 27, 2016

(54) NEGATIVE PRESSURE SENSOR ABNORMALITY DETECTION APPARATUS, CONTROL APPARATUS FOR INTERNAL COMBUSTION ENGINE AND CONTROL SYSTEM

(71) Applicant: TOYOTA JIDOSHA KABUSHIKI KAISHA, Toyota-shi, Aichi-ken (JP)

(72) Inventors: Jumpei Kakehi, Toyota (JP); Kouki Moriya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/946,076

(22) Filed: Nov. 19, 2015

(65) Prior Publication Data

US 2016/0185333 A1   Jun. 30, 2016

(30) Foreign Application Priority Data

Dec. 26, 2014   (JP) .................................. 2014-266326

(51) Int. Cl.
*B60T 7/12* (2006.01)
*B60T 17/22* (2006.01)
(Continued)

(52) U.S. Cl.
CPC .............. *B60T 17/221* (2013.01); *B60T 8/171* (2013.01); *B60T 8/885* (2013.01); *F02D 41/042* (2013.01);
(Continued)

(58) Field of Classification Search
CPC ................... B60W 2030/206; F02D 41/1498; F02D 19/025; F02D 41/22
(Continued)

(56) References Cited

U.S. PATENT DOCUMENTS 5,902,398 A * 5/1999 Kohno ................... A01H 4/006
118/23
2006/0180363 A1 * 8/2006 Uchisasai ................ B60K 6/48
180/65.275

(Continued)

FOREIGN PATENT DOCUMENTS

JP   2011-122519 A   6/2011
JP   2014-070531 A   4/2014
(Continued)

*Primary Examiner* — John Kwon
(74) *Attorney, Agent, or Firm* — Oliff PLC

(57) ABSTRACT

A negative pressure sensor abnormality detection apparatus includes a negative pressure sensor that outputs a signal corresponding to a negative pressure that a negative pressure pump generates, the negative pressure assisting a vehicle driver's brake operation; a negative pressure detection part that detects the negative pressure based on the signal that is output by the negative pressure sensor; a number-of-rotations counting part that counts the number of rotations of the negative pressure pump; and an abnormality determination part that determines that the negative pressure sensor is in an abnormal condition if, under a condition where a change in the driver's brake operation falls within a predetermined range, a change in the negative pressure detected by the negative pressure detection part along with an increase in the number of rotations counted by the number-of-rotations counting part is out of a predetermined range.

9 Claims, 6 Drawing Sheets

(51) Int. Cl.
*F02D 41/04* (2006.01)
*F02D 41/06* (2006.01)
*F02D 41/26* (2006.01)
*B60T 8/171* (2006.01)
*B60T 8/88* (2006.01)

(52) U.S. Cl.
CPC ............. *F02D 41/065* (2013.01); *F02D 41/26* (2013.01); *B60T 2270/413* (2013.01)

(58) Field of Classification Search
USPC ......... 701/101, 110, 114, 115; 123/690, 703, 123/478, 480; 73/114.18
See application file for complete search history.

(56) References Cited

U.S. PATENT DOCUMENTS

| | | | |
|---|---|---|---|
| 2013/0057055 A1* | 3/2013 | Miyashita | B60T 13/52 303/12 |
| 2015/0178997 A1* | 6/2015 | Ohsaki | G07C 5/0825 701/29.1 |
| 2015/0360699 A1* | 12/2015 | Sakai | B60T 13/52 701/70 |
| 2016/0171792 A1* | 6/2016 | Shimose | F02D 41/222 701/114 |

FOREIGN PATENT DOCUMENTS

| | | |
|---|---|---|
| JP | 2014-120865 A | 6/2014 |
| JP | 2016-000972 A | 1/2016 |
| WO | 2015/189673 A1 | 12/2015 |

\* cited by examiner

NEGATIVE PRESSURE SENSOR ABNORMALITY DETECTION APPARATUS, CONTROL APPARATUS FOR INTERNAL COMBUSTION ENGINE AND CONTROL SYSTEM

BACKGROUND OF THE INVENTION

1. Field of the Invention

The present invention relates to a negative pressure sensor abnormality detection apparatus, a control apparatus for an internal combustion engine and a control system.

2. Description of the Related Art

In the related art, a negative pressure sensor abnormality detection apparatus determining an abnormality in a negative pressure sensor is known (for example, see Japanese Laid-Open Patent Application No. 2011-122519). Such a negative pressure sensor abnormality detection apparatus has a negative pressure sensor that outputs a signal corresponding to a negative pressure, and detects the negative pressure based on the signal from the negative pressure sensor. Then, based on the negative pressure detection result, the negative pressure sensor abnormality detection apparatus determines whether the negative pressure sensor has an abnormality. Actually, if a state where the signal from the negative pressure sensor is out of a desired normal range continues greater than or equal to a predetermined period of time, the negative pressure sensor abnormality detection apparatus determines that the negative pressure sensor is in an abnormal condition.

Also, a vehicle having such a negative pressure sensor abnormality detection apparatus mounted has a brake booster assisting the driver's braking operation using a negative pressure generated through rotation of an internal combustion engine. Such a vehicle is an idling-stop vehicle automatically stopping an internal combustion engine when a predetermined stopping condition is satisfied, and, after the automatic stopping, automatically restarts the internal combustion engine when a predetermined restart condition is satisfied. Further, if it is determined that a negative pressure sensor is in an abnormal condition as mentioned above, automatic stopping of the internal combustion engine is inhibited.

SUMMARY OF THE INVENTION

According to one aspect of the present invention, a negative pressure sensor abnormality detection apparatus includes a negative pressure sensor that outputs a signal corresponding to a negative pressure that a negative pressure pump generates, the negative pressure assisting a vehicle driver's brake operation; a negative pressure detection part that detects the negative pressure based on the signal that is output by the negative pressure sensor; a number-of-rotations counting part that counts the number of rotations of the negative pressure pump; and an abnormality determination part that determines that the negative pressure sensor is in an abnormal condition if, under a condition where a change in the driver's brake operation falls within a predetermined range, a change in the negative pressure detected by the negative pressure detection part along with an increase in the number of rotations counted by the number-of-rotations counting part is out of a predetermined range.

Other objects, features and advantages of the present invention will become more apparent from the following detailed description when read in conjunction with the accompanying drawings.

DETAILED DESCRIPTION OF THE EMBODIMENTS

For the purpose of convenience, the description of the above-mentioned related art will be continued first. As the above-mentioned abnormality in the negative pressure sensor, there can be a deviation abnormality in that a gain deviation, an offset deviation, or so, occurs due to temperature characteristics, aging, or so, while the negative pressure sensor outputs the signal changing according to a change in a negative pressure. However, in the control apparatus disclosed in the above-mentioned Japanese Laid-Open Patent Application No. 2011-122519, it is not possible to determine that the negative pressure sensor has an abnormality unless a state where the output signal is out of the above-mentioned desired normal range is reached. Therefore, the control apparatus in the related art is not capable of detecting a deviation abnormality of the negative pressure sensor if a gain deviation or an offset deviation is relatively small so that the output signal still falls within the desired normal range. Therefore, there may be a case where, even if a deviation abnormality occurs in the negative pressure sensor, it cannot actually be detected as an abnormality.

The embodiments have been devised in consideration of such circumstances, and an object of the embodiments is to provide a negative pressure sensor abnormality detection apparatus capable of detecting a deviation abnormality occurring in a negative pressure sensor; a control apparatus for an internal combustion engine capable of avoiding an inconvenience otherwise occurring due to automatic stopping of the internal combustion engine being carried out when a deviation abnormality occurs in the negative pressure sensor; and a control system including the negative pressure sensor abnormality detection apparatus and the control apparatus for the internal combustion engine.

Below, using the accompanying drawings, the embodiments of negative pressure sensor abnormality detection apparatuses and control apparatuses for internal combustion engines will be described.

First Embodiment

Figure 1:
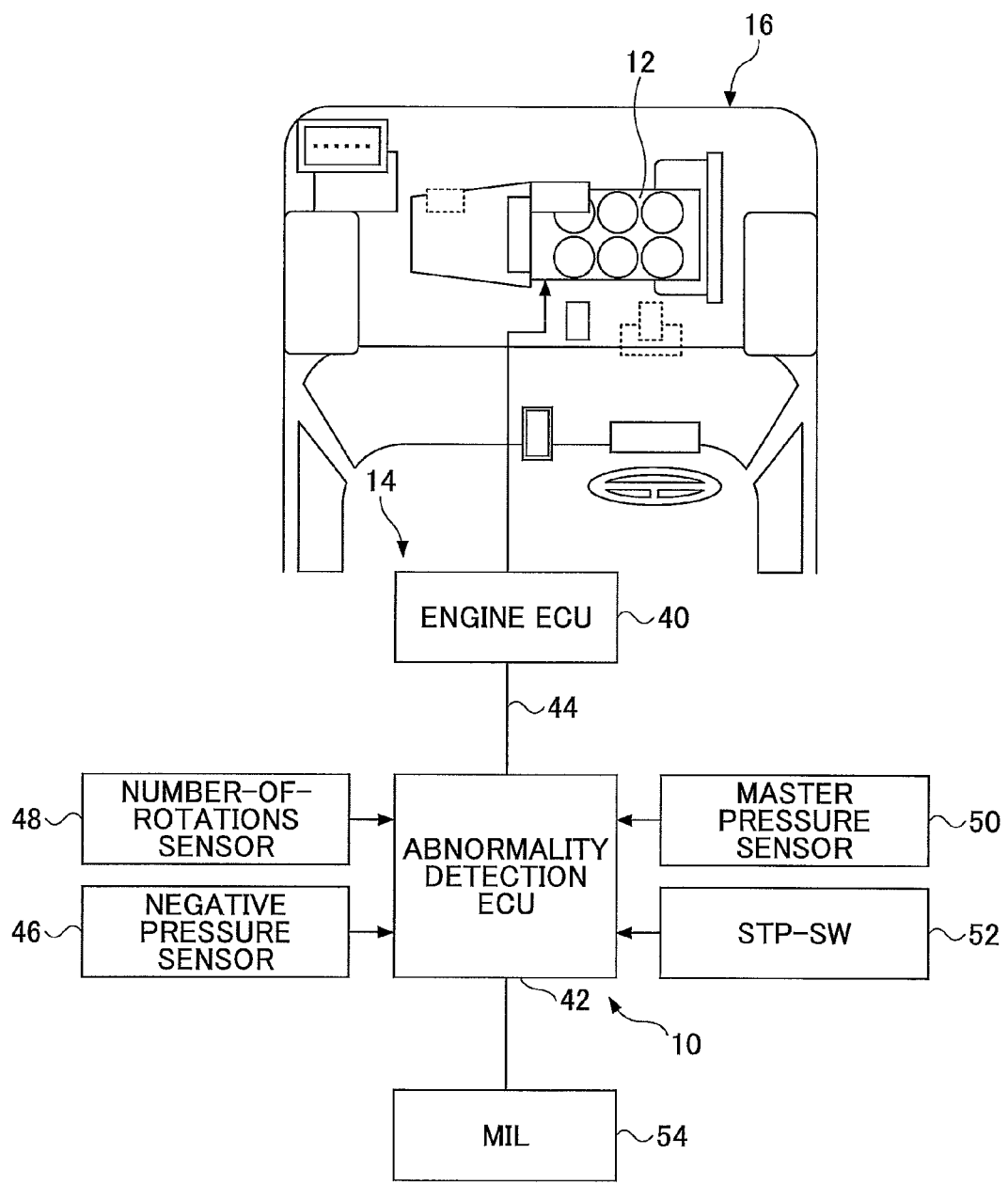
FIG. 1 illustrates a system configuration of a vehicle including a negative pressure sensor abnormality detection apparatus and a control apparatus for an internal combustion engine according to a first embodiment.
Figure 2:
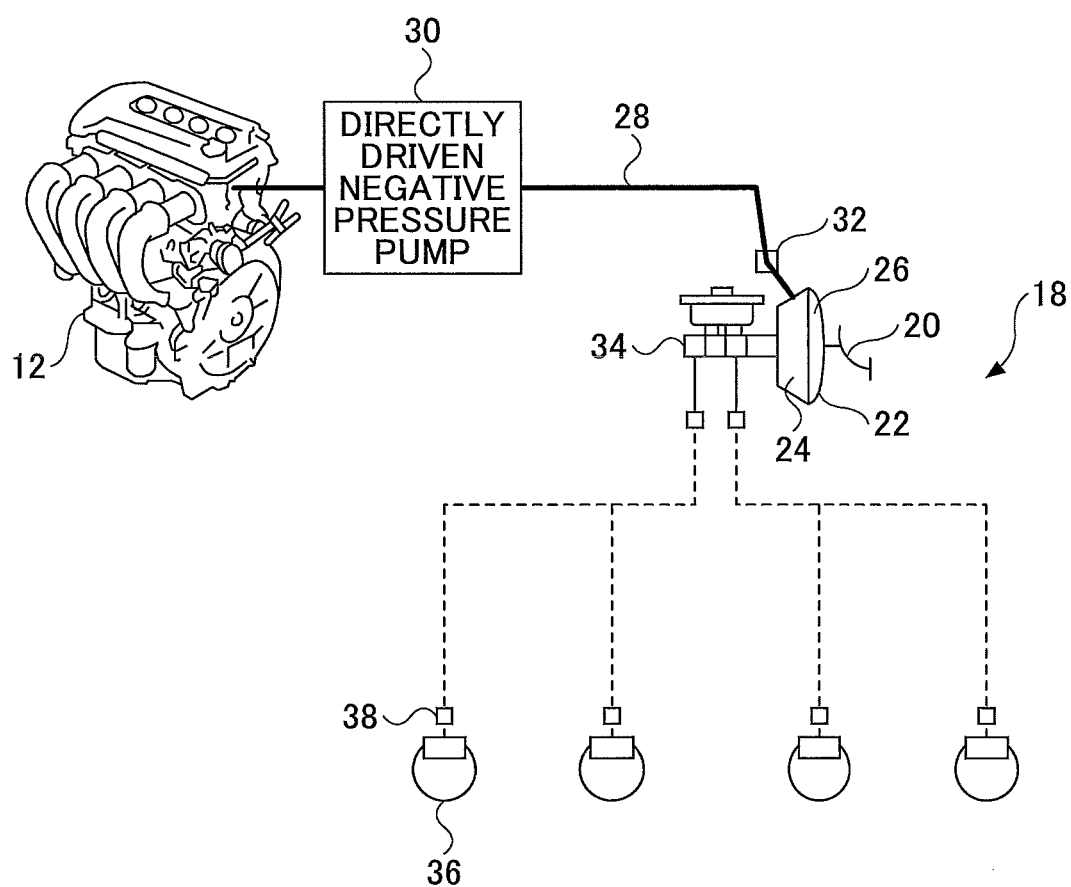
FIG. 2 illustrates a configuration of a brake system mounted in the vehicle according to the first embodiment.

FIG. 1 illustrates a system configuration of a vehicle 16 including a negative pressure sensor abnormality detection apparatus 10 and a control apparatus 14 for an internal combustion engine 12 according to a first embodiment. Note that a system including the negative pressure sensor abnormality detection apparatus 10 and the control apparatus 14 for the internal combustion engine 12 is one example of the "control system". FIG. 2 illustrates a configuration of a brake system 18 mounted in the vehicle 16 according to the first embodiment.

As shown in FIGS. 1 and 2, the vehicle 16 in the first embodiment includes the internal combustion engine 12 and the brake system 18. The internal combustion engine 12 is a heat engine generating vehicle motive power through explosive combustion of fuel. The internal combustion engine 12 can be a gasoline engine or a diesel engine. The internal combustion engine 12 can be configured in such a manner as to be started by an engine starter that is driven by electric power supplied from an on-vehicle battery.

The brake system 18 has a brake pedal 20 and a brake booster 22. The brake pedal 20 is operated (trodden on) by the driver (in particular, with a foot thereof) of the vehicle 16. The brake pedal 20 is a pedal with which the driver performs a brake tread operation to increase the tread force or the tread amount for increasing the braking force of the vehicle 16. Also, the brake pedal 20 is a pedal with which the driver performs a brake returning operation to reduce the tread force or the tread amount for reducing the braking force from the state where the brake pedal 20 has been trodden on. The brake booster 22 is linked with the brake pedal 20.

The brake booster 22 has, inside thereof, a negative pressure chamber 24 and a pressure change chamber 26 separated with a diaphragm installed therebetween. A directly driven negative pressure pump 30 is connected to the negative pressure chamber 24 through a negative pressure pipe 28. In the middle of the negative pressure pipe 28, a check valve 32 that is a one-way valve allowing only an airflow directed toward the directly driven negative pressure pump 30 from the negative pressure chamber 24 is installed. The check valve 32 opens when the pressure in the negative pressure pipe 28 at the side of the negative pressure chamber 24 is greater than that at the side of the directly driven negative pressure pump 30.

The directly driven negative pressure pump 30 is a pump supplying a negative pressure lower than atmospheric pressure to the negative pressure pipe 28 and the negative pressure chamber 24 (of the brake booster 22) as a result of being driven according to rotation of the internal combustion engine 12. Note that, hereinafter, the expression that "the negative pressure is greater" means that the pressure is in a state of being closer to the zero kPa (vacuum pressure), and the expression that "the negative pressure is less" means that the pressure is in state of being closer to atmospheric pressure. Also, the expression that "the negative pressure increases" or "the negative pressure is increased" means that the pressure changes or is changed to the side closer to the zero and the expression that "the negative pressure decreases" or "the negative pressure is decreased" means that the pressure changes or is changed to the side closer to atmospheric pressure.

The directly driven negative pressure pump 30 is connected to a cam of the internal combustion engine 12, and, as a result of being rotated at, for example, half the rotational speed of the internal combustion engine 12, supplies a negative pressure to the negative pressure pipe 28. The negative pressure thus supplied to the negative pressure pipe 28 is then supplied to the negative pressure chamber 24. In the negative pressure chamber 24, a negative pressure corresponding to the rotation of the directly driven negative pressure pump 30, i.e., the rotation of the internal combustion engine 12, is generated. The directly driven negative pressure pump 30 has such a property as to be able to generate a negative pressure greater than or equal to a predetermined level (actually, near the zero kPa) in the negative pressure chamber 24 if a state where the rotational speed of the internal combustion engine 12 is greater than or equal to a predetermined value has been continued greater than or equal to a predetermined period of time.

If the brake pedal 20 is not trodden on, the negative pressure in the negative pressure chamber 24 is supplied to the pressure change chamber 26 of the brake booster 22. In this case, the difference in pressure between the pressure change chamber 26 and the negative pressure chamber 24 is not very great. On the other hand, if the brake pedal 20 is trodden on, the atmospheric air is supplied to the pressure change chamber 26 depending on the brake tread force applied to the brake pedal 20. In this case, a pressure difference depending on the brake tread force is generated between the negative pressure chamber 24 and the pressure change chamber 26. The pressure difference acts as an assisting force to the brake tread force applied to the brake pedal 20 at a predetermined multiplication ratio. Thus, during rotation of the directly driven negative pressure pump 30, i.e., during rotation of the internal combustion engine 12, the brake booster 22 generates an assisting force supplementing the driver's brake tread force applied to the brake booster 22 by using the negative pressure in the negative pressure chamber 24, when the brake pedal 20 is trodden on.

A master cylinder 34 having a hydraulic chamber filled with a brake oil is linked to the brake booster 22. A master cylinder pressure is generated in the hydraulic chamber of the master cylinder 34 according to the resultant force of the brake tread force and the assisting force of the brake booster 22. Wheel cylinders 38 installed at respective wheels 36 are connected to the master cylinder 34. Each wheel cylinder 38 applies brake force to the corresponding wheel 36 according to the master cylinder pressure in the master cylinder 34.

The control apparatus 14 mounted in the vehicle 16 includes an engine controlling electronic control unit (hereinafter, simply referred to as an "engine ECU") 40 mainly including a microcomputer. Actuators, an engine starter, and so forth, of an injector, a fuel pump, and so forth, for jetting fuel of the internal combustion engine 12, are electrically connected to the engine ECU 40. The engine ECU 40 controls driving and stopping the respective actuators and starting and stopping the engine starter of the internal combustion engine 12.

Also, the engine ECU 40 has such a configuration as to be able to automatically stop the internal combustion engine 12 when a predetermined stopping condition is satisfied, and also, automatically start (restart) the internal combustion engine 12 when a predetermined restart condition is satisfied after the internal combustion engine 12 has been thus automatically stopped. Hereinafter, such a way of control will be referred to as "start and stop" ("S & S") control. That is, the vehicle 16 is an idling-stop vehicle carrying out S & S control. Thanks to S & S control, it is possible to improve the fuel efficiency because the internal combustion engine 12 can be automatically stopped when the predetermined stopping condition is satisfied.

The above-mentioned predetermined stopping condition in S & S control can be that, after the internal combustion engine 12 is started and travelling of the vehicle 16 is started, the vehicle 16 is decelerated as a result of, for example, a brake tread operation of the driver's treading on the brake pedal 20 being performed (for example, the vehicle speed is reduced to be less than or equal to a predetermined vehicle speed, and/or the deceleration of the vehicle 16 becomes greater than or equal to a predetermined deceleration). The above-mentioned predetermined restart condition can be that, after execution of S & S control is started, the above-mentioned brake pedal returning operation and/or an accelerator operation is performed, the on-vehicle electricity load increases to be greater than or equal to a predetermined value, and/or the like.

The negative pressure sensor abnormality detection apparatus 10 mounted in the vehicle 16 includes a negative pressure abnormality detection electronic control unit (hereinafter, simply referred to as an "abnormality detection ECU") 42 mainly including a microcomputer. The abnormality detection ECU 42 and the engine ECU 40 are connected via an in-vehicle Local Area Network (LAN) 44. The in-vehicle LAN 44 is a communication bus such as, for example, a Controller Area Network (CAN). The abnormality detection ECU 42 and the engine ECU 40 can mutually send and receive data via the in-vehicle LAN 44.

A negative pressure sensor 46 is connected to the abnormality detection ECU 42. The negative pressure sensor 46 is placed at a position where a negative pressure is generated by the directly driven negative pressure pump 30 (for example, the negative pressure chamber 24 of the brake booster 22 or the negative pressure pipe 28). The "position where a negative pressure is generated by the directly driven negative pressure pump 30" is simply referred to as a "negative pressure generation position", hereinafter. The negative pressure sensor 46 outputs a signal corresponding to the negative pressure at the negative pressure generation position. The negative pressure sensor 46 is a sensor to monitor the negative pressure at the negative pressure generation position. The signal that is output from the negative pressure sensor 46 is supplied to the abnormality detection ECU 42. The abnormality detection ECU 42 detects the negative pressure Pvac at the negative pressure generation position based on the signal thus supplied by the negative pressure sensor 46.

The abnormality detection ECU 42 stops an automatic stopping operation and automatically starts the internal combustion engine 12 to secure the negative pressure in the negative pressure chamber 24, if the thus detected negative pressure Pvac has not been being kept to be greater than or equal to a predetermined negative pressure (in other words, if the detected negative pressure Pvac has a value on the atmospheric pressure side of the predetermined negative pressure) during the automatic stopping of the internal combustion engine 12 due to S & S control. Actually, the abnormality detection ECU 42 sends an instruction to the engine ECU 40 via the in-vehicle LAN 44 to cause it to automatically start the internal combustion engine 12. As a result of the instruction being thus sent, the engine ECU 40 automatically starts the internal combustion engine 12 that has been being automatically stopped due to S & S control.

It is also possible that the abnormality detection ECU 42 transmits data indicating the negative pressure Pvac thus detected to the engine ECU 40 via the in-vehicle LAN 44. In this case, the engine ECU 40 can use the negative pressure Pvac for controlling driving the respective actuators in the internal combustion engine 12, or so. Note that it is also possible that, instead, data indicating the negative pressure Pvac is supplied to the engine ECU 40 directly from the negative pressure sensor 46, and is used for controlling driving the respective actuators in the internal combustion engine 12, or so.

A number-of-rotations counter 48 is connected to the abnormality detection ECU 42. The number-of-rotations counter 48 can be installed on a rotational shaft or so of the internal combustion engine 12. The number-of-rotations counter 48 outputs a signal corresponding to the number of rotations of the directly driven negative pressure pump 30. The signal that is output by the number-of-rotations counter 48 is supplied to the abnormality detection ECU 42. The abnormality detection ECU 42 detects the number of rotations N of the directly driven negative pressure pump 30 based on the signal supplied from the number-of-rotations counter 48. Note that the number-of-rotations counter 48 can be a counter that counts the number of rotations of the directly driven negative pressure pump 30 and resets the count value to zero when it reaches a predetermined value. The abnormality detection ECU 42 can calculate the number of rotations of the directly driven negative pressure pump 30 (i.e., count the number of times the directly driven negative pressure pump 30 is rotated) during a given period of time, based on the signal output by the number-of-rotations counter 48.

A master pressure sensor 50 is connected to the abnormality detection ECU 42. The master pressure sensor 50 is placed in the hydraulic chamber of the master cylinder 34. The master pressure sensor 50 outputs a signal corresponding to the pressure (i.e., the above-mentioned master cylinder pressure) generated in the hydraulic chamber of the master cylinder 34. The signal that is output by the master pressure sensor 50 is supplied to the abnormality detection ECU 42. The abnormality detection ECU 42 detects the pressure (hereinafter, referred to as a "master pressure") Pm in the hydraulic chamber of the master cylinder 34 based on the signal supplied by the master pressure sensor 50.

The stop lamp switch 52 is connected to, the abnormality detection ECU 42. The stop lamp switch 52 is turned on and off according to whether the driver performs a brake operation on the brake pedal 20. The stop lamp switch 52 is turned on when the brake pedal 20 is trodden on from a state there no tread force is applied to the brake pedal 20. The stop lamp switch 52 is turned off when the brake pedal 20 is still not trodden on from a state there no tread force is applied to the brake pedal 20. The abnormality detection ECU 42 detects the state of the stop lamp switch 52.

A malfunction indicator lamp (MIL) 54 that the driver can see is placed, for example, in a meter, and is connected to the abnormality detection ECU 42. As will be described later, the abnormality detection ECU 42 determines whether the negative pressure sensor 46 is in an abnormal condition (note that, the "abnormal condition" can be a deviation abnormal condition such as that caused by a gain deviation, an offset deviation, or so) based on the negative pressure Pvac in the negative pressure chamber 24 detected as mentioned above. If the abnormality detection ECU 42 determines that the negative pressure sensor 46 is in an abnormal condition, the abnormality detection ECU 42 sends an instruction to the engine ECU 40 via the in-vehicle LAN 44 to cause it to inhibit automatic stopping of the internal combustion engine 12 due to S & S control, carries out diagnostic storage of information indicating the abnormality of the negative pressure sensor 46, and also, turns on the MIL 54 to report the abnormality of the negative pressure sensor 46 or the inhibition of automatic stopping of the internal combustion engine 12.

Next, using FIGS. 3 and 4, operations of the negative pressure sensor abnormality detection apparatus 10 and the control apparatus 14 for the internal combustion engine 12 according to the first embodiment will be described.

Figure 3:
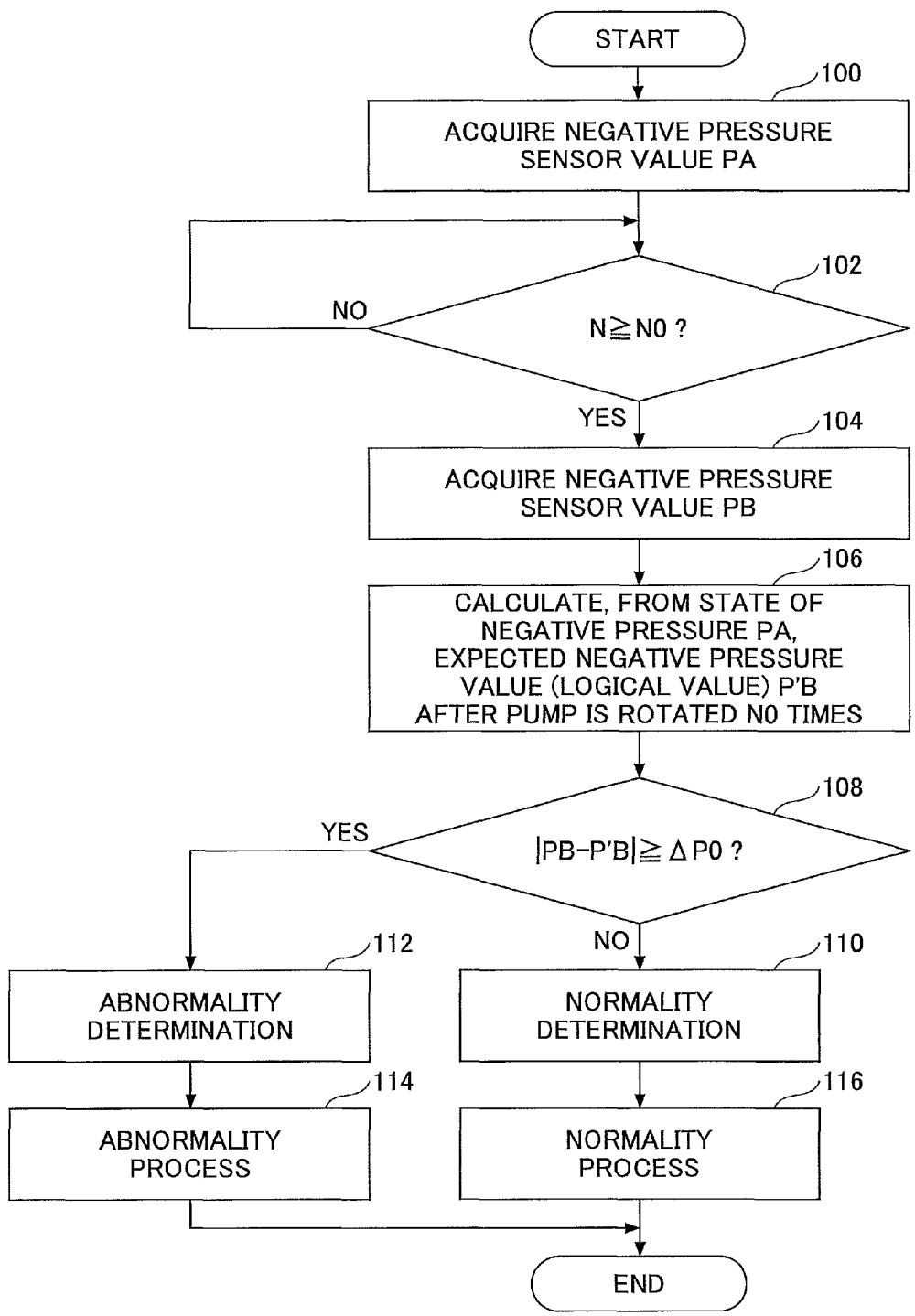
FIG. 3 is a flowchart illustrating an example of a control routine executed in the negative pressure sensor abnormality detection apparatus and the control apparatus for the internal combustion engine according to the first embodiment.

FIG. 3 is a flowchart illustrating an example of a control routine executed in the negative pressure sensor abnormality detection apparatus and the control apparatus for the internal combustion engine according to the first embodiment. FIG. 4 illustrates the relationship between the number of rotations N of the directly driven negative pressure pump 30 and the negative pressure Pvac at the negative pressure generation position for illustrating a method of detecting an abnormality in the negative pressure sensor.

In the brake system 18 according to the first embodiment, when a tread operation is removed from a state where the tread operation is performed on the brake pedal 20, and a brake returning operation is performed, the pressure difference between the pressure change chamber 26 of the brake booster 22 and the negative pressure chamber 24 decreases due to the decrease in the brake tread force. As a result, the negative pressure in the negative pressure chamber 24 steeply decreases to the atmospheric pressure side. Also, when the brake returning operation of the brake pedal 20 is performed during automatic stopping of the internal combustion engine 12 due to S & S control, the internal combustion engine 12 is automatically started due to the predetermined restart condition being satisfied. As a result, an increase in the rotational speed of the internal combustion engine 12 occurs after the decrease in the negative pressure in the negative pressure chamber 24 with a delay. When the internal combustion engine 12 is thus rotated, the negative pressure in the negative pressure chamber 24 gradually increases from the atmospheric pressure side to the zero (kPa) due to a rotation operation of the directly driven negative pressure pump 30 accordingly. Note that, this increase in the negative pressure is stably performed depending on the capability of the directly driven negative pressure pump 30 if almost no change occurs in the brake operation on the brake pedal 20, i.e., neither brake tread operation nor brake returning operation is performed (i.e., the position of the brake pedal 20 is not moved).

In the negative pressure sensor abnormality detection apparatus 10 according to the first embodiment, the abnormality detection ECU 42 excludes a timing when a change in the brake operation of the brake pedal 20 is relatively great (actually, excludes a timing when the negative pressure in the negative pressure chamber 24 of the brake booster 22 is decreased due to a brake operation of the brake pedal 20) as a timing of determining whether the negative pressure sensor 46 is in an abnormal condition.

Actually, first, the abnormality detection ECU 42 reads the master pressure Pm based on the signal supplied by the master pressure sensor 50, or reads the state of the stop lamp switch 52, every predetermined period of time. Then, the abnormality detection ECU 42 detects a timing of the negative pressure being hardly decreased due to the driver's brake operation of the brake pedal 20, based on the thus read data. This timing of the negative pressure being hardly decreased to be detected can be, for example, a timing when the master pressure Pm is less than a predetermined value, a timing when the temporal change in the master pressure Pm is kept within a predetermined range, or a timing when the stop lamp switch 52 is in its turned off state.

If the negative pressure is decreased due to a brake operation of the brake pedal 20 and the above-mentioned timing cannot be detected, the abnormality detection ECU 42 does not proceed to any process. On the other hand, if the abnormality detection ECU 42 detects a timing of the negative pressure being not decreased due to a brake operation of the brake pedal 20, the abnormality detection ECU 42 first detects the negative pressure Pvac at the negative pressure generation position based on the signal from the negative pressure sensor 46 and acquires it as a negative pressure PA (step 100).

After thus acquiring the negative pressure PA, the abnormality detection ECU 42 detects the number of rotations N of the directly driven negative pressure pump 30 based on the signal from the number-of-rotations counter 48 as mentioned above, and also, determines whether the detected number of rotations N reaches a predetermined number N0 (step 102). Note that, the predetermined number N0 can be such a number of rotations that it can be clear therefrom that, due to the rotation of the directly driven negative pressure pump 30, the negative pressure changes (increases), and can be a predetermined fixed number of rotations.

When determining that the number of rotations N of the directly driven negative pressure pump 30 counted from the time of acquiring the negative pressure PA has not reached the predetermined number N0, the abnormality detection ECU 42 again executes step 102. On the other hand, when determining that the number of rotations N of the directly driven negative pressure pump 30 from the time of acquiring the negative pressure PA has reached the predetermined number N0, the abnormality detection ECU 42 then detects the negative pressure Pvac at the negative pressure generation position based on the signal from the negative pressure sensor 46, and acquires it, as a negative pressure PB at the time of the reaching (step 104).

Note that, it is preferable that, as a condition to be satisfied before acquiring the negative pressure PB in step 104, the negative pressure should have been hardly decreased continuously due to a brake operation of the brake pedal 20, i.e., almost no change has occurred in the brake operation, from when the negative pressure PA was acquired. That is, it is preferable that only when the negative pressure has been hardly decreased from when the negative pressure PA was acquired, the negative pressure PB is acquired, the following process is then carried out, and thus, it is determined whether the negative pressure sensor 46 has an abnormality. This is because it is preferable to avoid an influence of a change in the negative pressure due to a brake operation on a determination as to whether the negative pressure sensor 46 has an abnormality.

The abnormality detection ECU 42 calculates an expected negative pressure value P'B expected to be generated at the negative pressure generation position when the directly driven negative pressure pump 30 has been rotated the predetermined number N0 of times from when the negative pressure PA was acquired (step 106). Note that the expected negative pressure value P'B is determined according to the vacuum performance of the directly driven negative pressure pump 30, and is varied according to the rotational speed of the directly driven negative pressure pump 30 and the initial value of the negative pressure (i.e., the above-mentioned negative pressure PA).

Figure 4:
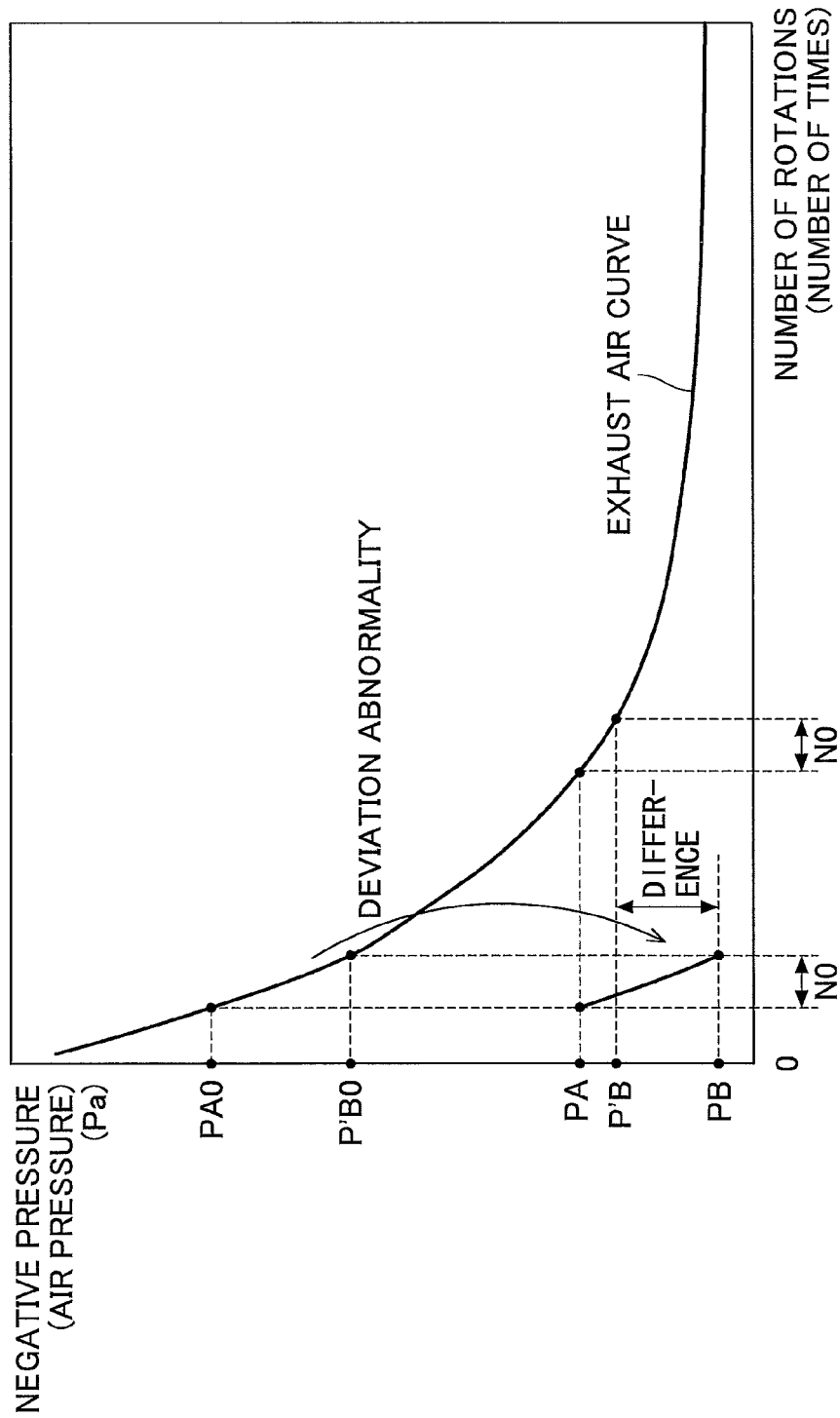
FIG. 4 illustrates the relationship between the number of rotations of the negative pressure pump and the negative pressure at a negative pressure generation position for illustrating a method of detecting an abnormality in a negative pressure sensor.

When the directly driven negative pressure pump 30 is rotated from the state of the negative pressure PA, the air pressure at the negative pressure generation position (Pa (pascal)) draws an exhaust air curve such as that shown in FIG. 4 where the air pressure at the negative pressure generation position gradually decreases with an increase in the number of rotations N of the directly driven negative pressure pump 30 counted therefrom. This exhaust air curve is such that the air pressure exponentially changes with respect the number of rotations of the directly driven negative pressure pump 30 counted. Also, this exhaust air curve can be corrected based on the altitude, the air pressure, the temperature and/or the like at which the vehicle 16 is currently present. The air pressure P'B on the exhaust air curve at a time when the directly driven negative pressure pump 30 has been rotated the predetermined number N0 of times from the state of the pressure PA can be expected or calculated according to the following formula (1). Note that, the values A and B in the formula (1) are determined based on the vehicle items/data, the vacuum performance of the directly driven negative pressure pump 30, and/or the like, and are values unique to the vehicle 16.

$$P'B=(PA-A)\exp(-B \times N0)+A \qquad (1)$$

Next, the abnormality detection ECU 42 compares the negative pressure PB acquired in step 104 and the expected negative pressure value P'B calculated in step 106, and determines whether the difference therebetween is greater than or equal to a predetermined value ΔP0 (step 108). Note that, the predetermined value ΔP0 is a threshold for determining a deviation abnormality of the negative pressure sensor 46, and is a value previously determined experimentally or logically.

If the abnormality detection ECU 42 determines in step 108 that the condition |PB−P'B|≥ΔP0 is not satisfied, it can be determined that the change in the negative pressure Pvac with respect to the number of rotations of the directly driven negative pressure pump 30 based on the sensor value of the negative pressure sensor 46 corresponds to a change along the exhaust air curve shown in FIG. 4. Therefore, the abnormality detection ECU 42 determines that the negative pressure sensor 46 is in a normal condition (step 110). On the other hand, if the abnormality detection ECU 42 determines that the condition |PB−P'B|≥ΔP0 is satisfied, it can be determined that the change in the negative pressure Pvac with respect to the number of rotations of the directly driven negative pressure pump 30 based on the sensor value of the negative pressure sensor 46 does not correspond to a curve along the exhaust air curve shown in FIG. 4. Therefore, the abnormality detection ECU 42 determines that the negative pressure sensor 46 is in an abnormal condition (step 112).

In fact, for example, if such a deviation abnormality of an offset deviation occurs that the negative pressure value represented by the output signal of the negative pressure sensor 46 is deviated to the vacuum pressure side from the actual negative pressure, the sensor value PA of the negative pressure sensor 46 acquired in step 100 is a value deviated to the vacuum pressure side from the true value PA0 of the negative pressure, as shown in FIG. 4. Also, if the directly driven negative pressure pump 30 is thereafter rotated the predetermined number N0 of times, the sensor value PB of the negative pressure sensor 46 acquired in step 104 is a value deviated to the vacuum pressure side from the true value P'B0 of the negative pressure. Note that, if no deviation abnormality of a gain deviation occurs in the negative pressure sensor 46 when such a deviation abnormality of an offset deviation occurs, the slope between the sensor value PA and the sensor value PB is the same as the slope between the true value PA0 and the true value P'B0.

The case will now be assumed where the sensor values PA and PB are thus acquired with offsets to the vacuum pressure side from the true values PA0 and P'B0. In this case, if the abnormality detection ECU 42 calculates (according to the formula (1)) the expected negative pressure value P'B expected to be acquired at the negative pressure generation position after the directly driven negative pressure pump 30 has been rotated the predetermined number N0 of times from when acquiring the sensor value PA having the offset to the vacuum pressure side from the true value PA0, the thus calculated value P'B is deviated from the true value P'B0, and also, is deviated from the sensor value PB, as shown in FIG. 4. Then, if the deviation between the calculated value P'B and the sensor value PB is greater than or equal to the predetermined value ΔP0, the abnormality detection ECU 42 determines that the negative pressure sensor 46 is in an abnormal condition.

If the abnormality detection ECU 42 determines in step 112 that the negative pressure sensor 46 is in an abnormal condition, the abnormality detection ECU 42 then, as an abnormality process, sends such an instruction to the engine ECU 40 via the in-vehicle LAN 44 as to inhibit automatic stopping of the internal combustion engine 12 due to S & S control, carries out diagnostic storage of information indicating the abnormality of the negative pressure sensor 46, and also, turns on the MIL 54 to report to the driver the abnormality of the negative pressure sensor 46 or the inhibition of automatic stopping of the internal combustion engine 12 (step 114). Thus, when it is determined that the negative pressure sensor 46 is in an abnormal condition, automatic stopping of the internal combustion engine 12 is inhibited. However, it is also possible that, when it is determined that the negative pressure sensor 46 is in an abnormal condition, not only automatic stopping of the internal combustion engine 12 is inhibited, but also the internal combustion engine 12 is automatically started if it is determined that the negative pressure sensor 46 is in an abnormal condition during automatic stopping of the internal combustion engine 12.

If the abnormality detection ECU 42 determines in step 110 that the negative pressure sensor 46 is in a normal condition, the abnormality detection ECU 42 then sends an instruction to the engine ECU 40 via the in-vehicle LAN 44 to cause it to stop inhibition of automatic stopping of the internal combustion engine 12 due to S & S control, and turns off the MIL 54 to stop such a report to the driver of the abnormality of the negative pressure sensor 46 or the inhibition of automatic stopping of the internal combustion engine 12, as a normality process (step 116).

In the control apparatus 14 of the internal combustion engine 12, when the engine ECU 40 receives from the abnormality detection ECU 42 the instruction to inhibit automatic stopping of the internal combustion engine 12 due to S & S control, it inhibits automatic stopping of the internal combustion engine 12 due to S & S control. Thus, it is possible to inhibit automatic stopping of the internal combustion engine 12 due to S & S control at a time of an abnormality in the negative pressure sensor 46. On the other hand, when the engine ECU 40 receives from the abnormality detection ECU 42 the instruction to stop inhibition of automatic stopping of the internal combustion engine 12 due to S & S control, it stops inhibition of automatic stopping of the internal combustion engine 12 due to S & S control. Thus, after the negative pressure sensor 46 returns to a normal condition, it is possible to stop inhibition of automatic stopping of the internal combustion engine 12 due to S & S control, and allow the automatic stopping.

Thus, in the negative pressure sensor abnormality detection apparatus 10 according to the first embodiment, it is possible to determine whether the negative pressure sensor 46 is in an abnormal condition based on whether the change in the negative pressure Pvac as the sensor value of the negative pressure sensor 46 during the directly driven negative pressure pump 30 being rotated the predetermined number N0 of times corresponds to the desired change along the exhaust air curve of the directly driven negative pressure pump 30.

Actually, the negative pressure PB as the sensor value of the negative pressure sensor 46 acquired after the directly driven negative pressure pump 30 has been rotated the predetermined number N0 of time from when the negative pressure PA was acquired as the sensor value of the negative pressure sensor 46 is compared with the expected negative pressure value P'B expected to be acquired when the directly driven negative pressure pump 30 has been rotated the predetermined number N0 of times from when the negative pressure PA was acquired. Then, it is possible to determine whether the negative pressure sensor 46 is in an abnormal condition based on whether the difference acquired from the comparison between the above-mentioned values PB and P'B is greater than or equal to the predetermined value ΔP0.

If no deviation abnormality such as a gain deviation, an offset deviation, or such occurs in the negative pressure sensor 46, the change in the negative pressure Pvac as the sensor value of the negative pressure sensor 46 during the directly driven negative pressure pump 30 being rotated the predetermined number N0 of times indicates the desired change along the exhaust air curve of the directly driven negative pressure pump 30, and the difference between the negative pressure PB and the expected negative pressure P'B is less than the predetermined value ΔP0. On the other hand, if such a deviation abnormality occurs in the negative pressure sensor 46, the change in the negative pressure Pvac as the sensor value of the negative pressure sensor 46 during the directly driven negative pressure pump 30 being rotated the predetermined number N0 of times is out of one indicating the above-mentioned desired change, and the difference between the negative pressure PB and the expected negative pressure P'B is greater than or equal to the predetermined value ΔP0.

Thus, the negative pressure sensor abnormality detection apparatus 10 according to the first embodiment can detect a deviation abnormality of the negative pressure sensor 46. Especially, the negative pressure sensor abnormality detection apparatus 10 according to the first embodiment can detect both types of deviation abnormalities. That is, if such an offset deviation occurs that the negative pressure value acquired from the negative pressure sensor 46 is deviated to the atmospheric pressure side from the actual negative pressure, the negative pressure sensor abnormality detection apparatus 10 according to the first embodiment can detect it. Further, if such an offset deviation occurs that the negative pressure value acquired from the negative pressure sensor 46 is deviated to the vacuum pressure side from the actual negative pressure, the negative pressure sensor abnormality detection apparatus 10 according to the first embodiment can also detect it.

Also, in the first embodiment, it is possible to make a determination as to whether the negative pressure sensor 46 has an abnormality only if no negative pressure is decreased, i.e., only if a change in a brake operation falls within a predetermined range, continuously from when the negative pressure PA was acquired until the directly driven negative pressure pump 30 is rotated the predetermined number N0 of time (i.e., until acquiring the negative pressure PB). Thereby, it is possible to avoid an influence of a change in the negative pressure due to a brake operation on a determination as to whether the negative pressure sensor 46 has an abnormality. Thus, it is possible to detect a deviation abnormality of the negative pressure sensor 46 with high accuracy.

Also, in the first embodiment, if the directly driven negative pressure pump 30 can be rotated the predetermined number N0 of times with almost no decrease in the negative pressure, it is possible to determine whether the negative pressure sensor 46 has an abnormality based on the change in the negative pressure at the negative pressure generation position during the corresponding period of time. Therefore, it is possible to detect a deviation abnormality of the negative pressure sensor 46 even when the driver causes the vehicle to travel, and thus, it is possible to rapidly detect a deviation abnormality of the negative pressure sensor 46.

Also, in the first embodiment, if the negative pressure sensor abnormality detection apparatus 10 detects, during automatic stopping of the internal combustion engine 12 due to S & S control, that the negative pressure Pvac at the negative pressure generation position detected with the negative pressure sensor 46 is deviated to the atmospheric pressure side from the predetermined negative pressure, or determines that the negative pressure sensor 46 is in an abnormal condition, the abnormality detection ECU 42 of the negative pressure sensor abnormality detection apparatus 10 sends out an instruction to the engine ECU 40 of the control apparatus 14 via the in-vehicle LAN 44, to inhibit automatic stopping of the internal combustion engine 12 due to S & S control or automatically start the internal combustion engine 12.

Therefore, according to the first embodiment, if, during automatic stopping of the internal combustion engine 12 due to S & S control, the negative pressure at the negative pressure generation position is on the atmospheric pressure side of the predetermined negative pressure and thus it is difficult to secure stopping the vehicle 16 in this state, it is possible to stop the automatic stopping of the internal combustion engine 12 due to S & S control and automatically start the internal combustion engine 12. Thus, it is possible to restart supplying the negative pressure to the brake booster 22 and generate such an assisting force as to be able to secure stopping the vehicle 16 in the brake booster 22.

Also, when a deviation abnormality to the vacuum pressure side occurs in the negative pressure sensor 46, there is a case where, although the actual negative pressure is on the atmospheric pressure side of the predetermined negative pressure, the negative pressure as the sensor value of the negative pressure sensor 46 is kept greater than or equal to the predetermined negative pressure. In this case, it is not possible to thus stop automatic stopping of the internal combustion engine 12 and automatically start the internal combustion engine 12 only through such control as to stop automatic stopping the internal combustion engine 12 due to S & S control and automatically start the internal combustion engine 12 based on whether the negative pressure is on the atmospheric pressure side of the predetermined negative pressure. Therefore, it may be difficult to generate such an assisting force as to be able to secure stopping the vehicle 16.

According to the first embodiment, if a deviation abnormality of the negative pressure sensor 46 including an offset deviation to the vacuum pressure side is thus detected, automatic stopping of the internal combustion engine 12 due to S & S control can be inhibited and the internal combustion engine 12 can be driven. Thus, it is possible to supply the negative pressure to the brake booster 22 and generate such an assisting force as to be able to secure stopping the vehicle 16 in the brake booster 22. Therefore, the control apparatus 14 for the internal combustion engine 12 according to the first embodiment can avoid the above-mentioned inconvenience of the internal combustion engine 12 being automatically stopped even when a deviation abnormality in the negative pressure sensor 46 including an offset deviation to the vacuum pressure side occurs.

Also, in the first embodiment, if it is determined that the negative pressure sensor 46 is in an abnormal condition as mentioned above, diagnostic storage of information concerning the abnormality in the negative pressure sensor 46 is carried out. Therefore, according to the first embodiment, it is possible that a vehicle dealer or so can easily determine the abnormality position in the vehicle 16 after the abnormality occurs in the negative pressure sensor 46.

Also, in the first embodiment, if it is determined that the negative pressure sensor 46 is in an abnormal condition, or automatic stopping of the internal combustion engine 12 due to due to S & S control is inhibited along with the determination that the negative pressure sensor 46 has abnormality as mentioned above, thereafter the MIL 54 is turned on so that the abnormality in the negative pressure sensor 46 or the inhibition of automatic stopping of the internal combustion engine 12 is reported. In this case, the driver can know the abnormality in the negative pressure sensor 46 or the inhibition of automatic stopping of the internal combustion engine 12 by looking at the MIL 54. Therefore, according to the first embodiment, if an abnormality in the negative pressure sensor 46 occurs, the abnormality in the negative pressure sensor 46 or inhibition of automatic stopping of the internal combustion engine 12 along with the abnormality is rapidly reported to the driver with the MIL 54. Therefore, it is possible to urge the driver to replace or repair the negative pressure sensor 46 having the abnormality.

Further, in the first embodiment, if it is determined that the negative pressure sensor 46 is in a normal condition after it is determined that the negative pressure sensor 46 is in an abnormal condition, inhibition of automatic stopping of the internal combustion engine 12 due to S & S control is stopped and also, the MIL 54 is turned off. Therefore, according to the first embodiment, after the negative pressure sensor 46 returns to a normal condition from an abnormal condition, automatic stopping of the internal combustion engine 12 due to S & S control is allowed, and thus, it is possible to improve the fuel efficiency. Also, it is possible to avoid useless exchange or repair of the negative pressure sensor 46.

Note that, concerning the first embodiment, the directly driven negative pressure pump 30 is one example of a "negative pressure pump", the abnormality detection ECU 42 of the negative pressure sensor abnormality detection apparatus 10 detecting the negative pressure at the negative pressure generation position based on the signal supplied from the negative pressure sensor 46 is one example of execution of a function of a "negative pressure detection part", the abnormality detection ECU 42 counting the number of rotations N of the directly driven negative pressure pump 30 based on the signal supplied from the number-of-rotations counter 48 is one example of execution of a function of a "number-of-rotations counting part", and the abnormality detection ECU 42 executing the process of step 112 in the routine shown in FIG. 3 is one example of execution of a function of an "abnormality determination part".

Also, concerning the first embodiment, the negative pressure PA is one example of a "first negative pressure", the negative pressure PB is one example of a "second negative pressure", the expected negative pressure value P'B is one example of an "expected negative pressure", the engine ECU 40 of the control apparatus 14 carrying out S & S control is one example of execution of a function of an "automatic control part", and the engine ECU 40 inhibiting automatic stopping of the internal combustion engine 12 due to S & S control according to an instruction of the abnormality detection ECU 42 is one example of execution of a function of an "automatic stopping inhibition part".

According to the first embodiment, the number-of-rotations counter 48 installed on the rotational shaft of the directly driven negative pressure pump 30 or so is used for the purpose of determining whether the number of rotations N of the directly driven negative pressure pump 30 reaches the predetermined number N0 of times after acquiring the negative pressure PA. However, the present invention is not limited thereto. It is also possible to use an NE sensor that outputs a signal corresponding to the rotational speed of the internal combustion engine 12, or a sensor that outputs a signal corresponding to the cam angle of the internal combustion engine 12, for the same purpose.

Second Embodiment

Using FIGS. 5 and 6, operations of a negative pressure sensor abnormality detection apparatus 10 and a control apparatus 14 for an internal combustion engine 12 according to a second embodiment will be described. Note that, concerning the second embodiment, the same reference numerals as those of the above-mentioned first embodiment are given to the same elements as those of the first embodiment, and the duplicate description will be omitted.

Figure 5:
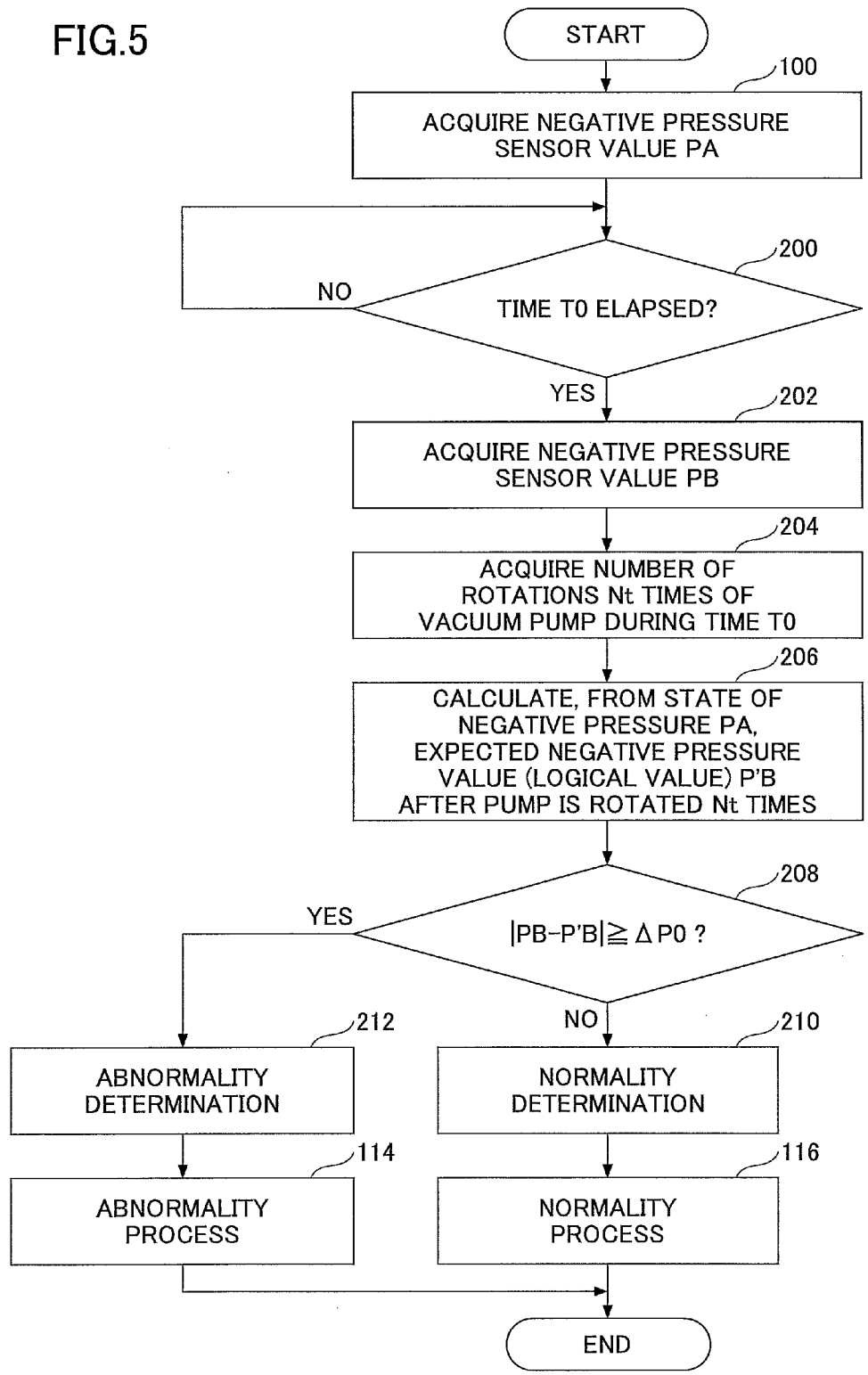
FIG. 5 is a flowchart illustrating an example of a control routine executed in the negative pressure sensor abnormality detection apparatuses and the control apparatuses for the internal combustion engines according to a second embodiment.

FIG. 5 is a flowchart illustrating an example of a control routine executed in the negative pressure sensor abnormality detection apparatus 10 and the control apparatus 14 for the internal combustion engine 12 according to the second embodiment. Note that, in FIG. 5, the same reference numerals as those of the first embodiment shown in FIG. 3 are given to the same steps as those of the first embodiment and the duplicate description will be omitted. FIG. 6 illustrates the relationship between an elapsed time and the negative pressure at a negative pressure generation position for illustrating a method of detecting an abnormality in the negative pressure sensor according to the second embodiment.

In the negative pressure sensor abnormality detection apparatus 10 according to the second embodiment, if the abnormality detection ECU 42 detects a timing of the negative pressure being not decreased due to a brake operation of the brake pedal 20 in the same way as the first embodiment, the abnormality detection ECU 42 first detects the negative pressure Pvac at the negative pressure generation position based on the signal from the negative pressure sensor 46 and acquires it as a negative pressure PA in step 100. Thereafter, the abnormality detection ECU 42 determines whether a predetermined period of time T0 has elapsed (step 200). Note that, the predetermined period of time T0 can be such a period of time that, during the period of time, it can be seen that the negative pressure changes due to a rotation of the directly driven negative pressure pump 30, and can be a predetermined period of time.

If the abnormality detection ECU 42 determines that the period of time having elapsed from when the negative pressure PA was acquired has not reached the predetermined period of time T0 yet, the abnormality detection ECU 42 again carries out step 200. On the other hand, if the abnormality detection ECU 42 determines that the period of time having elapsed from when the negative pressure PA was acquired has reached the predetermined period of time T0, the abnormality detection ECU 42 detects the negative pressure Pvac at the negative pressure generation position based on the signal from the negative pressure sensor 46, and acquires it as a negative pressure PB at the reaching time point (step 202).

Note that, as a condition to be satisfied before acquiring the negative pressure PB in step 202, it is preferable that almost none of the negative pressure has been decreased due to a brake operation of the brake pedal 20, i.e., almost no change has occurred in the brake operation, continuously from when the negative pressure PA was acquired. That is, it is preferable that only if almost none of the negative pressure is decreased continuously from when the negative pressure PA was acquired, the process starting from acquiring the negative pressure PB is continued and it is determined whether the negative pressure sensor 46 has an abnormality. This is because it is preferable to avoid an influence of a change in the negative pressure due to a brake operation on a determination as to whether the negative pressure sensor 46 has an abnormality.

If the abnormality detection ECU 42 thus determines that the period of time having elapsed from when the negative pressure PA was acquired has reached the predetermined period of time T0, the abnormality detection ECU 42 also acquires the number Nt of times of rotations of the directly driven negative pressure pump 30 based on the signal from the number-of-rotations counter 48 counted until the predetermined period of time T0 has elapsed from when the negative pressure PA was acquired (step 204). Next, the abnormality detection ECU 42 calculates an expected negative pressure value P'B expected to be generated at the negative pressure generation position when the directly driven negative pressure pump 30 has been rotated the predetermined number Nt of times from when the negative pressure PA was acquired (step 206). Note that, the expected negative pressure value P'B is determined according to the vacuum performance of the directly driven negative pressure pump 30, and also, is varied according to the rotational speed of the directly driven negative pressure pump 30 and an initial value of the negative pressure (i.e., the above-mentioned negative pressure PA).

Figure 6:
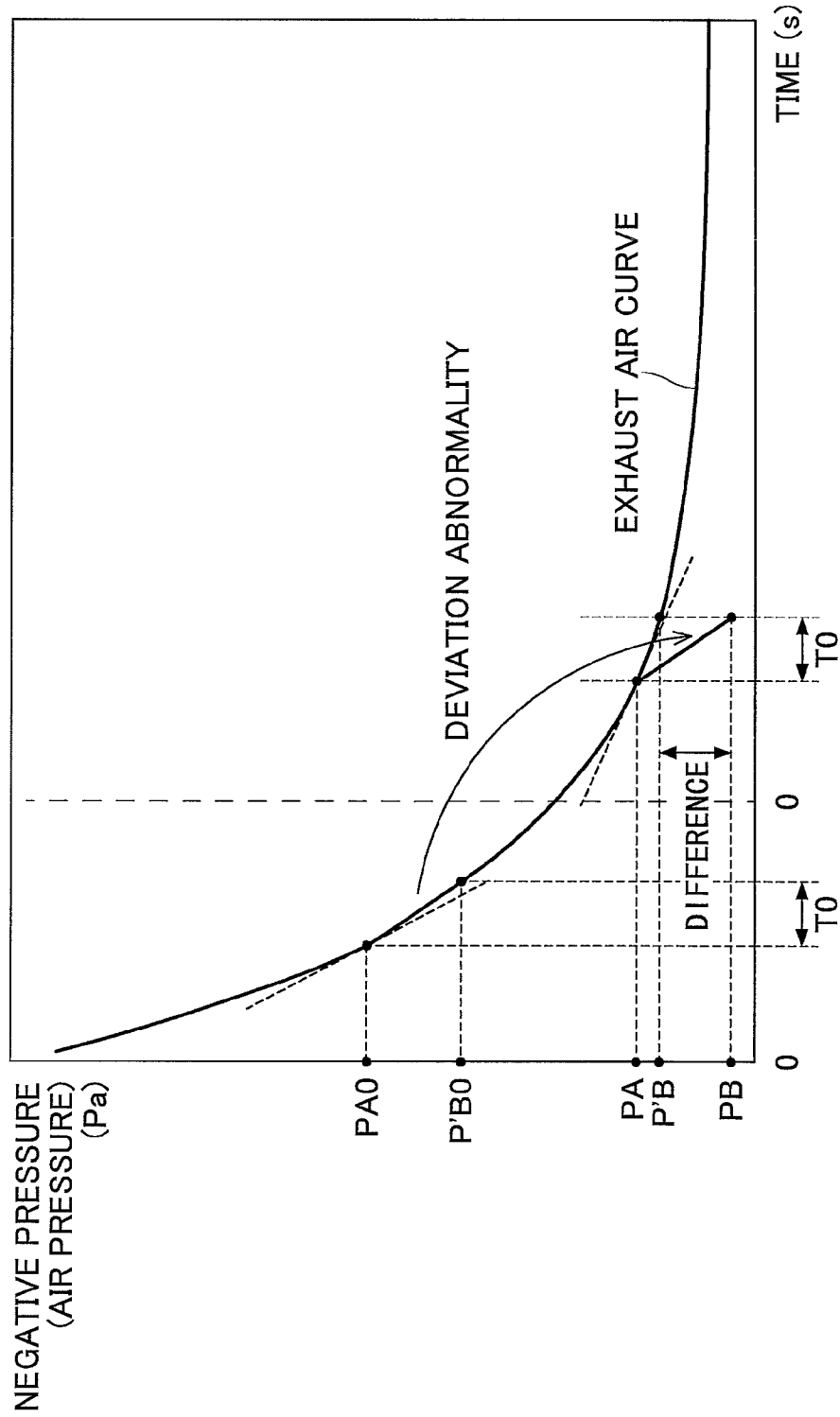
FIG. 6 illustrates the relationship between an elapsed time and the negative pressure at the negative pressure generation position for illustrating a method of detecting an abnormality in the negative pressure sensor.

If the directly driven negative pressure pump 30 is rotated at a fixed rotational speed from the state of the negative pressure PA, the air pressure at the negative pressure generation position (Pa (pascal)) draws an exhaust air curve gradually decreasing with the elapse of time, as shown in FIG. 6. The exhaust air curve is such that the air pressure exponentially changes. Also, the exhaust air curve can be one corrected based on the altitude, the air pressure, the temperature and/or the like at a position where the vehicle 16 is currently present. From the exhaust air curve, it is possible to expect or calculate the air pressure P'B acquired when the directly driven negative pressure pump 30 has been rotated for a period of time T0 according to the following formula (2) assuming that the directly driven negative pressure pump 30 rotates a number Nt of times during the period of time T0. Note that, the values A and B in the formula are determined based on the vehicle items/data, the vacuum performance of the directly driven negative pressure pump 30, and/or the like, and are values unique to the vehicle 16.

$$P'B=(PA-A)\exp(-B \times Nt)+A \quad (2)$$

Next, the abnormality detection ECU 42 compares the negative pressure PB acquired in step 202 and the expected negative pressure value P'B calculated in step 206, and determines whether the difference therebetween is greater than or equal to a predetermined value ΔP0 (step 208). Note that, the predetermined value ΔP0 is a threshold for determining a deviation abnormality in the negative pressure sensor 46 and is a value previously determined experimentally or logically.

As a result, when the abnormality detection ECU 42 determines that the condition |PB−P'B|≥ΔP0 is not satisfied, it can be determined that the temporal change in the negative pressure Pvac based on the sensor value of the negative pressure sensor 46 corresponds to a change along the exhaust air curve shown in FIG. 6. Therefore, the abnormality detection ECU 42 determines that the negative pressure sensor 46 is in a normal condition (step 210). On the other hand, when the abnormality detection ECU 42 determines that the condition |PB−P'B|≥ΔP0 is satisfied, it can be determined that the temporal change in the negative pressure Pvac based on the sensor value of the negative pressure sensor 46 does not correspond to a change along the exhaust air curve shown in FIG. 6. Thus, the abnormality detection ECU 42 determines that the negative pressure sensor 46 is in an abnormal condition (step 212).

In fact, for example, if a deviation abnormality of such an offset deviation occurs that the negative pressure value represented by the output signal of the negative pressure sensor 46 is deviated to the vacuum pressure side from the actual negative pressure, the sensor value PA of the negative pressure sensor 46 acquired in step 100 is deviated to the vacuum pressure side from the true value PA0 of the negative pressure, as shown in FIG. 6. Further, if thereafter the predetermined period of time T0 has elapsed, the sensor value PB of the negative pressure sensor 46 acquired in step 202 becomes a value deviated to, the vacuum pressure side from the true value P'B0 of the negative pressure. Note that, at this time, if no deviation abnormality of a gain deviation occurs in the negative pressure sensor 46, the slope between the sensor value PA and the sensor value PB is equal to the slope between the true value PA0 and the true value P'B0.

The case will now be assumed where the true values PA0 and P'B0 with offsets to the vacuum pressure side from the sensor values PA and PB are thus acquired. In this case, when the abnormality detection ECU 42 calculates (according to the formula (2)) the expected negative pressure value P'B expected to be acquired when the directly driven negative pressure pump 30 is rotated the predetermined number Nt of times at the negative pressure generation position from when acquiring the sensor value PA having the offset to the vacuum pressure side from the true value PA0, the thus calculated value P'B is deviated from the true value P'B0, and also, is deviated from the sensor value PB, as shown in FIG. 6. Then, if the deviation between the calculated value P'B and the sensor value PB is greater than or equal to the predetermined value ΔP0, the abnormality detection ECU 42 determines that the negative pressure sensor 46 is in an abnormal condition.

Thereafter, the abnormality detection ECU 42 carries out a process depending on the thus detected state of the negative pressure sensor 46 (step 114 or 116 in FIG. 5).

Thus, the negative pressure sensor abnormality detection apparatus 10 according to the second embodiment can determine whether the negative pressure sensor 46 is in an abnormal condition based on whether the change in the negative pressure Pvac as the sensor value of the negative pressure sensor 46 during the predetermined period of time T0, i.e., during the directly driven negative pressure pump 30 being rotated the predetermined number Nt of times indicates a desired change along the exhaust air curve of the directly driven negative pressure pump 30.

Actually, the negative pressure PB as the sensor value of the negative pressure sensor 46 acquired after the elapse of the predetermined period of time T0 from when the negative pressure PA was acquired as the sensor value of the negative pressure sensor 46 is compared with the expected negative pressure value P'B expected based on an assumption that the directly driven negative pressure pump 30 has been rotated the predetermined number Nt of time during the predetermined period of time T0 from when the negative pressure PA was acquired. Then, it is possible to determine whether the negative pressure sensor 46 is in an abnormal condition based on whether the difference therebetween acquired from the comparison is greater than or equal to the predetermined value ΔP0.

Therefore, also the negative pressure sensor abnormality detection apparatus 10 according to the second embodiment can detect a deviation abnormality of the negative pressure sensor 46. Especially, the negative pressure sensor abnormality detection apparatus 10 can detect two types of deviation abnormalities. That is, if such an offset deviation occurs that the negative pressure value acquired from the negative pressure sensor 46 is deviated to the atmospheric pressure side from the actual negative pressure, the negative pressure sensor abnormality detection apparatus 10 can detect it. Further, if such an offset deviation occurs that the negative pressure value acquired from the negative pressure sensor 46 is deviated to the vacuum pressure side from the actual negative pressure, the negative pressure sensor abnormality detection apparatus 10 can also detect it.

Also, in the second embodiment, it is possible that a determination as to whether the negative pressure sensor 46 has an abnormality is carried out only if no negative pressure has been decreased, i.e., a change in the brake operation has been falling within a predetermined range, continuously from when the negative pressure PA was acquired until the predetermined period of time T0 has elapsed (i.e., until acquiring the negative pressure PB). Thereby, it is possible to avoid an influence of a change in the negative pressure due to a brake operation on a determination as to whether the negative pressure sensor 46 has an abnormality, and thus, it is possible to detect a deviation abnormality of the negative pressure sensor 46 with high accuracy.

Also, in the second embodiment, if the predetermined period of time T0 has elapsed with almost no decrease in the negative pressure from when the negative pressure PA was acquired, it is possible to determine whether the negative pressure sensor 46 has an abnormality at the negative pressure generation position based on the change in the negative pressure during the period of time. Therefore, even when the driver causes the vehicle to travel, it is possible to detect a deviation abnormality of the negative pressure sensor 46, and thus, it is possible to rapidly detect a deviation abnormality in the negative pressure sensor 46.

Further, in the second embodiment, in the same way as the above-mentioned first embodiment, if the negative pressure sensor abnormality detection apparatus 10 detects, during, automatic stopping of the internal combustion engine 12 due to S & S control, that the negative pressure Pvac at the negative pressure generation position detected with the negative pressure sensor 46 is on the atmospheric pressure side of the predetermined negative pressure, or determines that the negative pressure sensor 46 is in an abnormal condition, the abnormality detection ECU 42 of the negative pressure sensor abnormality detection apparatus 10 sends out an instruction to the engine ECU 40 of the control apparatus 14 via the in-vehicle LAN 44 to inhibit automatic stopping of the internal combustion engine 12 due to S & S control or automatically start the internal combustion engine 12. Therefore, also in the second embodiment, it is possible to acquire the same advantageous effects as those of the above-mentioned first embodiment.

Note that, in the second embodiment, the abnormality detection ECU 42 executing step 212 in the routine shown in FIG. 5 is one example of execution of a function of an "abnormality determination part", and the expected negative pressure value P'B is one example of an "the expected negative pressure".

In the second embodiment, in order to acquire the number of rotations Nt of the directly driven negative pressure pump 30 during the predetermined period of time T0, the number-of-rotations counter 48 is used. However, the present invention is not limited thereto. It is also possible to acquire the number of rotations Nt based on the average rotational speed of the directly driven negative pressure pump 30, the average rotational speed of the internal combustion engine 12, the average rotational speed of the cam angle, or so, during the predetermined period of time T0.

Also, in the second embodiment, whether the negative pressure sensor 46 has an abnormality is determined based on the change in the negative pressure Pvac during the predetermined period of time T0 after acquiring the negative pressure PA. This determination is made actually based on whether the difference between the negative pressure PB detected when the predetermined period of time T0 has elapsed after acquiring the negative pressure PA and the expected negative pressure value P'B based on the number of rotations Nt of the directly driven negative pressure pump 30 counted during the predetermined period of time T0 is greater than or equal to the predetermined value ΔP0.

However, the present invention is not limited thereto. It is also possible that whether the negative pressure sensor 46 has an abnormality is determined based on the initial negative pressure PA, the rotational speed of the directly driven negative pressure pump 30, and the speed of the increase in the negative pressure. That is, it is possible to expect the speed of the increase in the negative pressure at a time based on the initial negative pressure PA and the rotational speed of the directly driven negative pressure pump 30 at the time. Therefore, it is possible that the thus expected speed of the increase in the negative pressure is compared with the speed of the increase (i.e., the slope) of the negative pressure Pvac based on the sensor value of the negative pressure sensor 46. Then, it is possible that, if the speed of the increase in the negative pressure Pvac based on the sensor value is greatly deviated from the expected speed of the increase in the negative pressure, the negative pressure sensor 46 is in an abnormal condition.

In the above-mentioned first and second embodiments, if it is determined that the negative pressure sensor 46 is in an abnormal condition, automatic stopping of the internal combustion engine 12 due to S & S control is inhibited. However, the present invention is not limited thereto. It is also possible that even if it is determined that the negative pressure sensor 46 is in an abnormal condition, automatic stopping of the internal combustion engine 12 due to S & S control is limitedly allowed. For example, it is possible that if the negative pressure sensor 46 is determined as being in an abnormal condition, a zero point correction of the sensor, a change in a threshold for allowing automatic stopping of the internal combustion engine 12 due to S & S control, or so, is carried out. Note that, it is possible that the change in a threshold for allowing automatic stopping of the internal combustion engine 12 due to S & S control is, for example, to add an allowance corresponding to a possible degradation in the accuracy of the negative pressure sensor 46 to the threshold used when the sensor is in a normal condition.

Also, in the first and second embodiments, the MIL 54 that is an indication lamp installed in the meter is used to report an abnormality of the negative pressure sensor 46 or inhibition of automatic stopping of the internal combustion engine 12 due to the abnormality to the driver. However, the present invention is not limited thereto. It is also possible to use another type of an indication device. It is also possible to use an acoustic reporting device instead of or in addition of such a visual reporting device as the MIL 54.

Also, in the first and second embodiments, the abnormality detection ECU 42 of the negative pressure abnormality detection apparatus 10 and the engine ECU 40 of the control apparatus 14 of the internal combustion engine 12 are separate apparatuses connected via the in-vehicle LAN 44 therebetween. However, the present invention is not limited thereto. It is also possible that the abnormality detection ECU 42 and the engine ECU 40 are configured to be a single ECU.

Thus, according to the first and second embodiments, it is possible to detect a deviation abnormality of the negative pressure sensor. Also, it is possible to avoid inconvenience otherwise occurring due to automatic stopping of an internal combustion engine being executed even when the negative pressure sensor has a deviation abnormality.

Thus, the negative pressure sensor abnormality detection apparatuses, the control apparatuses for the internal combustion engines and the control systems have been described in the embodiments. However, the present invention is not limited to such specific embodiments. Various modifications can be made without departing from the claimed invention.

The present application is based on and claims the benefit of priority of Japanese Priority Application No. 2014-266326, filed on Dec. 26, 2014, the entire contents of which are hereby incorporated herein by reference.

What is claimed is:

1. A negative pressure sensor abnormality detection apparatus comprising:
   a negative pressure sensor that outputs a signal corresponding to a negative pressure that a negative pressure pump generates, the negative pressure assisting a vehicle driver's brake operation;
   a negative pressure detection part that detects the negative pressure based on the signal that is output by the negative pressure sensor;
   a number-of-rotations counting part that counts the number of rotations of the negative pressure pump; and
   an abnormality determination part that determines that the negative pressure sensor is in an abnormal condition if, under a condition where a change in the driver's brake operation falls within a predetermined range, a change in the negative pressure detected by the negative pressure detection part along with an increase in the number of rotations counted by the number-of-rotations counting part is out of a predetermined range.

2. The negative pressure sensor abnormality detection apparatus as claimed in claim 1, wherein
   the abnormality determination part determines that the negative pressure sensor is in an abnormal condition, if a difference between a second negative pressure detected by the negative pressure detection part when the number of rotations counted by the number-of-rotations counting part after the negative pressure detection part detects a first negative pressure reaches a predetermined number of rotations and an expected negative pressure expected based on the predetermined number of rotations is greater than or equal to a predetermined value.

3. The negative pressure sensor abnormality detection apparatus as claimed in claim 1, wherein
   the abnormality determination part determines that the negative pressure sensor is in an abnormal condition if a difference between a second negative pressure detected by the negative pressure detection part when a predetermined period of time has elapsed after the negative pressure detection part detects a first negative pressure, and an expected negative pressure expected based on the number of rotations counted by the number-of-rotations counting part during the predetermined period of time is greater than or equal to a predetermined value.

4. A control apparatus for controlling an internal combustion engine, comprising:
   an automatic control part that automatically stops the internal combustion engine when a predetermined stopping condition is satisfied and automatically restarts the internal combustion engine when a predetermined restart condition is satisfied, and
   an automatic stopping inhibition part that inhibits the automatic control part from automatically stopping the internal combustion engine when the abnormality determination part of the negative pressure sensor abnormality detection apparatus claimed in claim 1 determines that the negative pressure sensor is in the abnormal condition.

5. The control apparatus as claimed in claim 4, wherein
   the abnormality determination part of the negative pressure sensor abnormality detection apparatus determines that the negative pressure sensor is in an abnormal condition, if, after the negative pressure detection part detects a first negative pressure, a difference between a second negative pressure detected by the negative pressure detection part when the number of rotations counted by the number-of-rotations counting part reaches a predetermined number of rotations and an expected negative pressure expected based on the predetermined number of rotations is greater than or equal to a predetermined value.

6. The control apparatus as claimed in claim 4, wherein
   the abnormality determination part of the negative pressure sensor abnormality detection apparatus determines that the negative pressure sensor is in an abnormal condition if, after the negative pressure detection part detects a first negative pressure, a difference between a second negative pressure detected by the negative pressure detection part when a predetermined period of time elapses and an expected negative pressure expected based on the number of rotations counted by the number-of-rotations counting part during the predetermined period of time is greater than or equal to a predetermined value.

7. A control system for controlling an internal combustion engine, comprising:
   the negative pressure sensor abnormality detection apparatus claimed in claim 1;
   an automatic control part that automatically stops the internal combustion engine when a predetermined stopping condition is satisfied and automatically restarts the internal combustion engine when a predetermined restart condition is satisfied, and an automatic stopping inhibition part that inhibits the automatic control part from automatically stopping the internal combustion engine when the abnormality determination part of the negative pressure sensor abnormality detection apparatus determines that the negative pressure sensor is in the abnormal condition.

8. The control system as claimed in claim 7, wherein
the abnormality determination part of the negative pressure sensor abnormality detection apparatus determines that the negative pressure sensor is in an abnormal condition, if, after the negative pressure detection part detects a first negative pressure, a difference between a second negative pressure detected by the negative pressure detection part when the number of rotations counted by the number-of-rotations counting part reaches a predetermined number of rotations and an expected negative pressure expected based on the predetermined number of rotations is greater than or equal to a predetermined value.

9. The control system as claimed in claim 7, wherein
the abnormality determination part of the negative pressure sensor abnormality detection apparatus determines that the negative pressure sensor is in an abnormal condition if, after the negative pressure detection part detects a first negative pressure, a difference between a second negative pressure detected by the negative pressure detection part when a predetermined period of time elapses and an expected negative pressure expected based on the number of rotations counted by the number-of-rotations counting part during the predetermined period of time is greater than or equal to a predetermined value.

* * * * *